Jan. 21, 1964   T. E. NOAKES   3,118,993
HEATING AND COOLING THERMOSTAT
Filed June 29, 1959   2 Sheets-Sheet 1
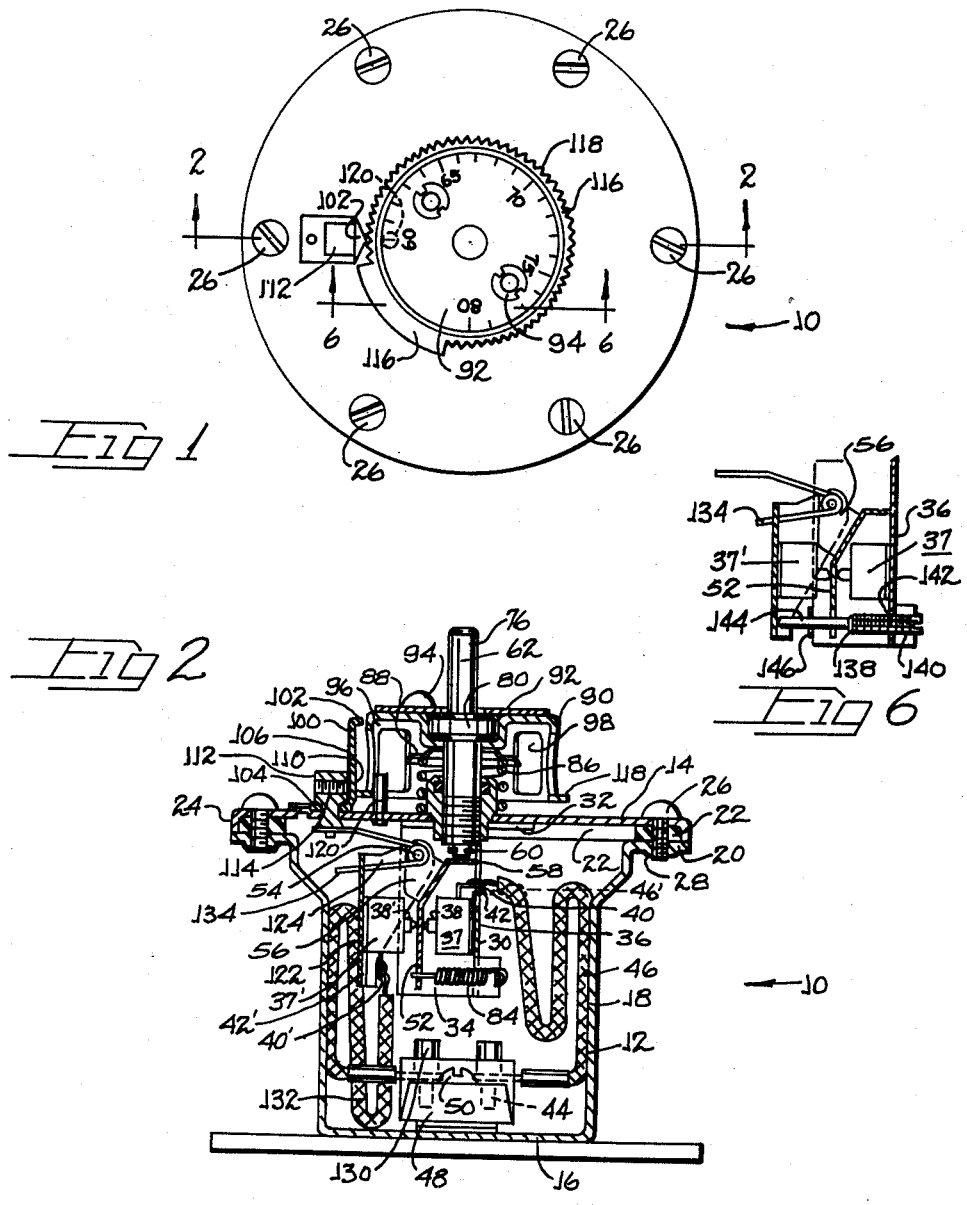
INVENTOR.
THOMAS EDMUND NOAKES
BY
WILSON, LEWIS & McRAE

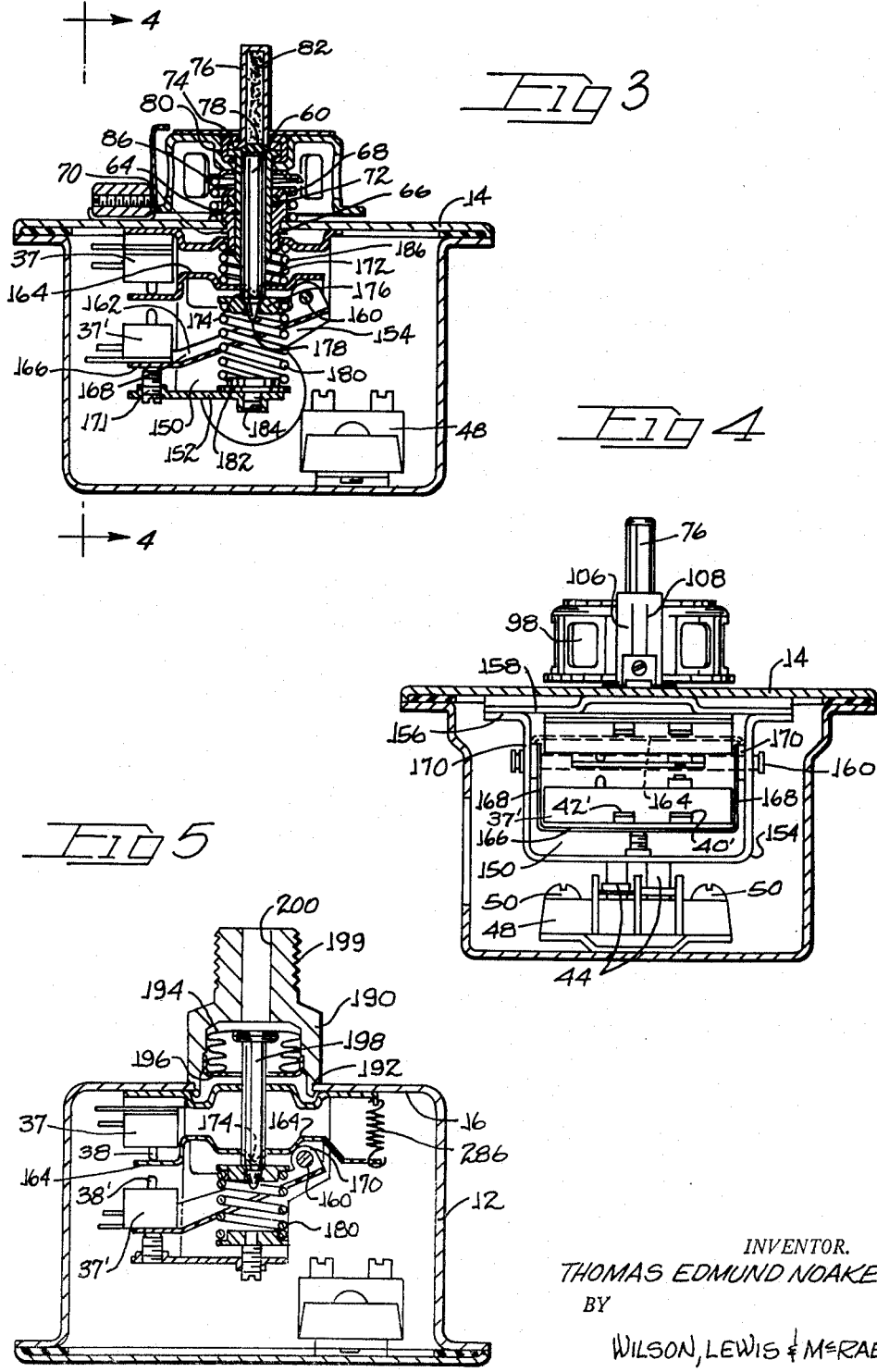

United States Patent Office 3,118,993
Patented Jan. 21, 1964

3,118,993
HEATING AND COOLING THERMOSTAT
Thomas Edmund Noakes, Detroit, Mich., assignor to American Radiator & Standard Sanitary Corporation, New York, N.Y., a corporation of Delaware
Filed June 29, 1959, Ser. No. 823,465
4 Claims. (Cl. 200—140)

This invention relates to a thermostat construction particularly designed for manufacture as a low cost, shock-proof, water-tight, accurately calibrated mechanism.

In many installations, particularly shipboard installations, there is a need for a thermostat which is shock-proof and water-tight. In many of these installations the thermostat is subjected to rough usage, and the thermostat components should therefore be of fairly rigid, long-life character so as to eliminate repair and replacement problems. Additionally, the thermostat in many cases is required to fit in small spaces, and should therefore be of relatively compact character with easy accessibility to the interior mechanisms in the event that parts repair or parts replacement is necessary.

The thermostat of the present invention is particularly designed to provide the above-described advantages. In addition, the thermostat of the present invention is particularly suited to use as a cooling thermostat and/or heating thermostat, i.e., a thermostat for controlling a heat producer and/or a cold producer. The arrangement of parts is such that a heat producer switch and/or cold producer switch can alternately or concurrently be incorporated within the switch housing, using the same actuating and adjusting mechanisms. In this manner the manufacturer is enabled to produce a line of thermostats with minimum numbers of different components. Also, testing and adjusting of the thermostat at the factory is considerably simplified.

In addition to the previously mentioned features of interchangeability and adjustability, the arrangement of the present invention permits a variation in the type of actuator for the thermostat. Thus, by suitable parts replacement the thermostat can be made to operate from a remote source or from a point directly adjacent the thermostat. In this manner the thermostat construction can be constructed to accommodate the desires of particular users in accordance with the type of installation to be encountered during use.

From the above discussion it will be seen that important objects of the invention are to provide a thermostat construction wherein:

(1) The thermostat is of shock-proof, water-tight construction;
(2) The thermostat is of relatively small size and low cost;
(3) The thermostat is adapted for manufacture as a heating thermostat, as a cooling thermostat or as a combination heating-cooling thermostat;
(4) The thermostat is adapted to incorporate actuator structure operated from a point adjacent the thermostat or actuator structure operated from a point remote from the thermostat;
(5) The thermostat is constructed to provide a jam-free operation, with the thermostat parts having relatively long service life;
(6) The thermostat construction is such as to enable easy access to its component parts.

Other objects of this invention will appear in the following description and appended claims, reference being had to the accompanying drawings forming a part of this specification wherein like reference characters designate corresponding parts in the several views.

In the drawings:
FIGURE 1 is a top plan view of one embodiment of the invention;
FIG. 2 is a sectional view taken substantially along line 2—2 in FIG. 1;
FIG. 3 is a sectional view taken through a second embodiment of the invention;
FIG. 4 is a sectional view taken substantially on line 4—4 in FIG. 3;
FIG. 5 is a sectional view taken through another embodiment of the invention; and
FIG. 6 is a sectional view taken through a portion of the FIG. 1 embodiment and substantially on line 6—6 in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGS. 1 and 2 there is shown a thermostat 10 comprising a housing structure defined by two opposed casing elements 12 and 14. Casing element 12 is of generally cup-like configuration with an end wall 16 and annular side wall 18 and a peripheral flange 20 at its mouth portion. Positioned on peripheral flange 20 is an annular compressible gasket 22 which underlies the peripheral portion of housing element 14. Housing element 14 is provided with an angularly turned flange 24 which serves to space the flat plate-like portion of element 14 from the flange 20 in such manner as to prevent undue compression of the gasket 22 when the fastening screws 26 are turned in. As shown in FIG. 2, fastening of screws 26 is preferably affected by flaring portions 28 of flange 20 downwardly and threading the screws thereinto.

The arrangement of parts is such as to provide a water-tight casing structure which adapts the device particularly for use on shipboard applications where moisture problems are frequently encountered.

Disposed within housing structure 12 is a bracket 30 having ear portions 32 for fastening it to the underside of housing element 14. The bracket comprises a pair of flange portions 34 (only one of which is visible in FIG. 2) and a web portion 36. Fixedly mounted on web portion 36 is a snap acting switch structure 37 having an operating plunger 38. Switch structure 37 may take several different forms, but as an illustrative example the switch may have internal mechanisms arranged as shown in U.S. Patents 2,407,089 and 2,669,618. The switch structure 37 is of the "snap action" type wherein a force tending to move plunger 38 into the switch housing is effective to complete a circuit between the terminals 40 and 42 carried by the switch housing. Removal of the external force from the plunger allows the plunger to be extended out of the switch housing by the switch blade force therein so as to automatically disconnect the circuit across the terminals 40 and 42. Terminals 40 and 42 are connected to flexible conductors 46 which lead to terminals 44 threaded into dielectric terminal block 48 fastened on housing end wall 16 by means of screws 50. As shown in FIG. 2 there appears to be only one terminal 44; however it will be understood that another terminal is arranged directly behind the illustrated terminal and that a conductor 46 is extended from terminal 42 to the concealed terminal in the space directly behind the front-most conductor 46. The lead-in conductors (not shown) are extended into housing element 12 through an opening in side wall 18 and connected onto respective ones of the terminals 44 to place the thermostat in operative circuitry with the heat producer controlled by switch structure 37.

In order to operate the switch structure 37 there is provided a lever 52 fulcrumed on a shaft 54. The shaft is mounted at its opposite end portions in the spaced flange portions 34 to provide an operative axis for the lever 52. As shown in FIG. 2 the lever 52 is provided with an ear 56 adjacent each of its lateral edges for mounting of the lever on shaft 54.

An end portion of lever 52 is turned at 58 to provide a surface for abutment against the piston or plunger 16 of thermostatic power element 62.

Power element 62 in FIG. 2 is similar to the power element shown in FIG. 3. As shown in FIG. 3 the power element includes a plunger guide sleeve 64 having its external surface threaded at 66 for adjustment of the power element axially relative to the fitting 68. Fitting 68 is provided with a staked-over portion 70 for its rigid immovable mounting on housing element 14. An O-ring 72 may be provided in fitting 68 for preventing moisture or other material from entering the thermostat housing through the joint between the fitting 68 and plunger guide 64. Plunger guide 64 is provided with an annular flange at its outer end which cooperates with annular flange 74 on power element container portion 76 to clamp a diaphragm 78 therebetween. An annular collar 80 is provided for retaining the power element components in their clamped positions. Container portion 76 is filled with a pellet of solid thermally expansible material 82, preferably compounded with dispersed heat conductive particles as described in U.S. Patent 2,259,846. The thermally expansible material may be any of several materials, as for example a high melting wax, a low melting wax, di-bromo benzene, paraffin or other material capable of undergoing substantial expansion in response to temperature increase.

Referring to FIG. 2 it will be seen that thermal expansion of the material within container portion 76 is effective to drive plunger 60 downwardly so as to pivot lever 52 in a clockwise direction about shaft 54. In this manner the plunger 38 is allowed to move outwardly of the switch housing 37 for interrupting the circuit through terminals 40 and 42 so as to discontinue operation of the heat producer (not shown). A tension spring 84 is trained between lever 52 and an offset portion of bracket 30 so as to urge the lever in a counterclockwise direction during contraction of material 82 within container portion 76. Thus, as the room cools to contract material 82 spring 84 moves lever 52 counterclockwise to thereby operate plunger 38 and connect the circuit across terminals 40 and 42 for putting the heat producer into operation.

The temperature setting of the power element 62 may of course be adjusted by turning it within its mounting element 68. Since there tends to be a play between the threads of sleeve 64 and the threads of fitting 68 there is preferably provided a compression spring 86 between plate 14 and a spring seat member 88 carried on the power element. Spring 86 exerts a continuous force on the power element such that the same thread faces on the plunger guide 64 are at all times engaged against the same thread faces on fitting 68. In this manner the power element is prevented from having any play in the fitting 68. As a result, the accuracy of the thermostat at the various temperature settings is improved.

In order to rotate the power element 62 relative to fitting 68 for temperature setting purposes there is provided a cup-like knob 90 fixedly carried on the power element collar 80. Securement of the knob on the power element is effected by means of a dial plate 92 having openings therein for reception of the shank portions of screws 94. Screws 94 extend into threaded openings not shown) in knob 90, the arrangement being such that members 90 and 92 cooperate to exert an axial clamping action on collar portion 80 for thereby locking the knob 90 onto the power element. The clamping may be suitably effected by a slight oversizing of the collar 80 relative to the depth of the recess in knob 90.

The side wall portions 96 of knob 90 are preferably provided with cut-away areas at 98 for the purpose of reducing the mass of member 90 so as to lower its effective heat conduction characteristics. In this manner element 90 is prevented from subtracting appreciable quantities of heat from thermal material 82. If knob 90 were constructed without the cut-away areas 98 the knob would tend to take heat from material 82 so that on ambient temperature increase material 82 would not expand with sufficient quickness to best operate the thermostat.

In order to provide visual means for indicating the temperature setting of the thermostat there is provided an index mechanism 100 having a pointer 102 arranged adjacent and in close proximity to the temperature values on dial plate 92. Index mechanism 100 includes a mounting portion 104 and an upwardly extending arm portion 106 which is provided with a pair of slits 108 (FIG. 4) for defining a deflectable arm 110. Mounting portion 104 carries a block 112 which is internally threaded to adjustably mount a set screw 114. It will be noted from FIGS. 1 and 2 that the lower end portion of knob wall 96 is turned outwardly to provide a peripheral flange 116, said flange having a series of recesses 118 spaced therearound in registry with the lower portion of deflectable arm 110. Thus, by turning screw 114 inwardly in its mounting block 112 the arm 110 can be forced into any one of the recesses 118 so as to lock the knob 90 in a desired position of adjustment. This feature is of particular importance in those installations wherein the thermostat is subjected to considerable vibrational forces which would tend to rotate the knob 90 and thereby undesirably change the temperature setting.

In order to provide a "back-up" structure opposing the force of screw 114 there is provided on element 14 an upright post or abutment member 120. Post 120 is located in alignment with screw 114 and within the hollow portion of knob 90. In operation, as screw 114 is turned in to advance arm 106 into a selected recess 118 the post 120 prevents the knob 90 from thereby being distorted or deformed from its illustrated symmetrical position with respect to the power element 62. Without post 120 the advancement of screw 114 would tend to cause a cocking and/or deformation of the knob 90.

It will be noted from FIG. 2 that in addition to the snap switch structure 37 there is provided a second switch structure 37' having an operating plunger 38'. Switch structure 37' is carried on a lever 122 having a pair of ears 124, only one of which is shown in FIG. 2. Ears 124 serve to fulcrum the lever 122 for pivotal movement on shaft 54, the arrangement being such that ears 124 are located just outside of the ears 56 for lever 52. In operation thermal expansion of the material within container portion 62 is effective to drive piston 60 downwardly so as to move lever 52 clockwise in a manner to operate plunger 38' for closing the circuit between switch terminals 40' and 42'. Each of terminals 40' and 42' is connected with a separate terminal 130 by means of a conductor 132, and each terminal 130 in turn serves to connect a lead-in conductor (not shown) from the cold producer under the control of switch structure 37'. It will therefore be seen that expansion of the material within container portion 76 by ambient temperature increase is effective to close the contacts within structure 37' for putting the cold producer into operation.

The purpose in mounting switch structure 37' on a movable support structure such as lever 122 is to provide for overtravel protection in the event that the thermal material should expand sufficiently to provide an excessive downward travel of plunger 60. Thus, any downward overtravel of plunger 60 merely causes the lever 122 to pivot clockwise without breakage of the switch structure or deformation of lever 52. An over-travel wire spring 134 is provided for maintaining the plunger 38' in operative engagement with lever 52. However, spring 134 is of fairly light construction and does not otherwise enter into operation of the thermostat.

During counterclockwise movement of lever 52 the circuit through switch structure 37' will be opened after lever 52 leaves contact with plunger 38'. Thus, there is provided an adjustable stop for limiting the counterclockwise motion of lever 122 under the influence of spring 134, as shown in FIGURE 6. After the lever 122 has engaged the stop 138, lever 52 may continue its counterclockwise motion to allow the plunger 38' to move outwardly relative to housing 37' for disconnecting the circuit through terminals 40' and 42'. Adjustable stop 138 includes a threaded portion 140 in meshing engagement with a threaded opening 142 in the web portion 36 of fixed bracket 30. Stop 138 also includes a smooth cylindrical portion 144 extended through an opening in a short flange 146 formed on bracket 30. The arrangement is such as to provide a two point support for screw 138 whereby the screw may be adjusted by turning it in and out so as to control the "break" position of the switch 37'. It will be appreciated that the adjustment provided by screw 138 serves to control the operating temperature for switch 37'. Preferably the screw 138 is soldered onto bracket 30 at the factory after calibration of the thermostat.

From the above discussion it will be seen that two adjustments are provided, i.e., the adjustment at 138 and the adjustment at 66. The adjustment at 138 serves to control the effective spacing between the plungers 38 and 38' so as to thereby control the operating temperature differential between the two switch structures. The adjustment at 66 serves to control the final equilibrium temperature which is to be obtained by both switch structures 37 and 37'.

The device shown in FIGS. 3 and 4 is in many respects similar to that shown in FIGS. 1 and 2, and similar reference numerals are employed wherever applicable. In the FIG. 3 construction there is provided a fixed bracket 150 having a web portion 152 and two flange portions 154. The end areas of flange portions 154 are turned laterally at 156 to provide ears for mounting the bracket onto the wall element 158 carried by housing element 14. Bracket 150 has extended thereacross a shaft 160 which serves as the fulcrum for levers 162 and 164. Lever 162 includes a web portion 166 and two side flanges 168 which define ear portions 170 journaled adjacent the opposite extremities of shaft 160. The position of lever 162 is controlled by a set screw 171 extending through the web portion 152 of bracket 150. As shown in FIG. 4, lever 162 carries a switch 37' which is adapted to have its terminals 40' and 42' connected into circuitry with terminals 50 on the terminal block 48 by conductors similar to the conductors 132 shown in FIG. 2.

Lever 164 is provided with an opening 172, and the wall portions alongside of said opening 172 are deformed to provide the projecting portions 174 engageable with the spring seat element 176. The central portion of element 176 is apertured to receive the reduced end portion 178 of power element plunger 60, said plunger thereby being operatively interconnected with a relatively heavy compression spring 180 trained between seat element 176 and a second seat element 182 adjustably positioned on bracket portion 152 by means of a threaded portion 184. Adjustment of element 182 determines the force developed by spring 180 for returning the piston 60 into the power element during ambient temperature decrease.

During ambient temperature increase the plunger 60 is moved out of the power element to allow the compression spring 186 to force lever 164 in a counterclockwise direction about shaft 160. In this manner the cold producer controlled by switch structure 37' is caused to be put into operation. During temperature decrease spring 180 acts to force plunger 60 into the power element; additionally, spring 180 acts through spring seat element 176 and projections 174 to move the lever 164 clockwise for thereby closing the circuit through switch structure 37 and causing the heat producer to operate.

It should be noted that the operative driving connection provided by the projections 174 constitutes a friction-free connection wherein each incremental motion of the piston 60 provides substantially the same incremental motion to lever 164. In this manner the accuracy of the instrument is improved.

The construction shown in FIG. 5 is similar in many respects to that shown in FIG. 3, and similar reference numerals are employed wherever applicable. In the FIG. 5 construction there is provided a fitting 190 having portions 192 staked or otherwise fixedly secured to the end wall 16 of the housing 12. Within fitting 190 there is disposed a bellows element 194 sealed to a cap 196, said cap being fitted into fitting 190, and the end wall of the bellows having secured thereon a piston or plunger 198. Fitting 190 is threaded at 199 for reception of a tube coupling element (not shown). The arrangement is such that a thermal sensing bulb may be located remote from the FIG. 5 thermostat and interconnected therewith by tubing communicating with the passage 200 in fitting 190. In this manner temperature increase of the bulb material is effective to increase the fluid pressure above bellows 194 so as to move piston 198 downwardly to move the lever 164 toward plunger 38'. Temperature decrease of the bulb material reverses piston 198 and is effective to allow the spring 180 to move the lever 164 in a direction for operating plunger 38 of switch structure 37.

FIG. 5 shows only one tension spring 286, but it will be appreciated that two such springs are provided, one adjacent each lateral edge of the lever 164. Springs 286 correspond with spring 186 in the FIG. 3 embodiment except that springs 286 serve the additional function of taking up any play between shaft 160 and lever 164. Thus, in the FIG. 3 embodiment the line of action of springs 286 is offset from the line of action of spring 180 so that springs 286 tend at all times to lift lever 164 relative to shaft 160 whereby to continually maintain the lever against the lower surface portions of the shaft. This arrangement is in contrast to that of the FIG. 3 arrangement wherein the shaft-contacting portions of lever 164 may shift up or down under the opposing influences of springs 180 and 186 in the event of any dimensional differences between the lever openings and shaft diameter. The spring arrangement of FIG. 5 may of course be employed in the FIG. 3 installation if desired.

From the above description it will be seen that each embodiment of the invention provides a relatively small, low cost, sealed thermostat construction having utility as a heating thermostat and/or cooling thermostat. The construction is such as to be easily and accurately calibrated, and the components are interconnected in such manner as to withstand severe shock forces encountered in service.

It will be appreciated that if the thermostat is to be used only as a heating thermostat then the cold producer switch 37 may be eliminated. Conversely, if the thermostat is to be used only as a cooling thermostat then the heat producer switch 37 may be eliminated.

Various modifications of the illustrated structure may be resorted to without departing from the spirit of the invention as defined in the appended claims.

I claim:

1. The combination comprising a support structure; a first lever fulcrumed on said support structure; a switch seated on said lever and having an operating plunger;

a second lever fulcrumed on said support structure and having a portion thereof engageable with the switch plunger for operating the switch; power means including a reciprocable thrust element; spring seat means carried by said thrust element; second spring seat means positioned between the support structure and said first spring seat means; a first relatively strong spring between the two seat means for urging the thrust element and second lever in directions to unload the operating plunger; adjusting means between the support structure and second spring seat means for varying the force of said first spring; and a second relatively weak spring urging the second lever to a position loading the switch plunger when the power means operates to overcome the first spring.

2. In a hot-cold thermostatic switch, a housing having a wall, a heat-sensitive power element including a container of thermally sensitive material and a piston guide, said piston guide being adjustably threaded through said wall, a piston reciprocable within said guide and extensible into said housing by thermal response of said thermally sensitive material, a lever pivotally mounted within said housing and having a portion engageable with said piston so that movement of said piston is effective to move said lever, means biasing said lever against said piston, opposing switches mounted within said housing in contacting relation to opposing surfaces of said lever, a hollow knob carried by said piston guide in surrounding relation to said container of thermally sensitive material, said knob being constructed of low mass and consequent low heat retention, an arm carried by said wall and engageable with said knob, and means biasing said arm into frictional, locking engagement with said knob to retain said knob in adjusted position, whereby the calibration of said lever relative to said opposed switches can be effected from the exterior of said housing by rotating said knob.

3. In a hot-cold thermostatic switch, a housing having a wall, a heat-sensitive power element including a container of thermally sensitive material and a piston guide, said piston guide being adjustably threaded through said wall, a piston reciprocable within said guide and extensible into said housing by thermal response of said thermally sensitive material, a first lever pivotally mounted within said housing and having a portion engageable with said piston so that movement of said piston is effective to move said lever, means biasing said lever against said piston, a first switch fixedly mounted within said housing and contactable with one surface of said first lever, a second lever pivotally mounted within said housing, a second switch mounted on said second lever and contactable with an opposite surface of said first lever, means for adjusting the position of the said second lever and thus said second switch with respect to said first lever opposite surface, means biasing said second lever and thus said second switch toward said first lever, a hollow knob carried by said piston guide in surrounding relation to said container of thermally sensitive material, said knob being constructed of low mass and consequent low heat retention, an arm carried by said wall and engageable with said knob, and means biasing said arm into frictional, locking engagement with said knob to retain said knob in adjusted position, whereby the calibration of said lever relative to said opposed switches can be effected from the exterior of said housing by rotating said knob.

4. In a hot-cold thermostatic switch, a housing having a wall, a heat-sensitive power element including a container of thermally sensitive material and a piston guide, said piston guide being adjustably threaded through said wall, a piston reciprocable within said guide and extensible into said housing by thermal response of said thermally sensitive material, a first lever pivotally mounted within said housing and having a portion engageable with said piston so that movement of said piston is effective to move said lever, means biasing said lever against said piston, a first switch fixedly mounted within said housing and contactable with one surface of said first lever, a second lever pivotally mounted within said housing, a second switch mounted on said second lever and contactable with an opposite surface of said first lever, means for adjusting the position of the said second lever and thus said second switch with respect to said first lever opposite surface, a hollow knob carried by said piston guide in surrounding relation to said container of thermally sensitive material, said knob being constructed of low mass and consequent low heat retention, an arm carried by said wall and engageable with said knob, and means biasing said arm into frictional, locking engagement with said knob to retain said knob in adjusted position, whereby the calibration of said lever relative to said opposed switches can be effected from the exterior of said housing by rotating said knob.

References Cited in the file of this patent

UNITED STATES PATENTS

| Number | Name | Date |
|---|---|---|
| 1,111,182 | Rouse | Sept. 22, 1914 |
| 1,692,540 | Benson | Nov. 20, 1928 |
| 1,749,392 | Penn | Mar. 4, 1930 |
| 1,791,598 | Longworth et al. | Feb. 10, 1931 |
| 1,997,262 | McGoldrick | Apr. 9, 1935 |
| 2,045,041 | McNicoll | June 23, 1936 |
| 2,128,807 | Ettinger | Aug. 30, 1938 |
| 2,344,535 | Clark | Mar. 21, 1944 |
| 2,407,696 | Webster | Sept. 17, 1946 |
| 2,531,246 | Batcheller | Nov. 21, 1950 |
| 2,562,385 | Marcellus | July 31, 1951 |
| 2,723,328 | Verkuil | Nov. 8, 1955 |
| 2,727,115 | Visser et al. | Dec. 13, 1955 |
| 2,739,204 | Garner et al. | Mar. 20, 1956 |
| 2,804,525 | Mantz | Aug. 27, 1957 |
| 2,820,117 | Waite | Jan. 14, 1958 |
| 2,828,373 | Sweger | Mar. 25, 1958 |
| 2,833,895 | Weber et al. | May 6, 1958 |
| 2,901,578 | Noakes | Aug. 25, 1959 |
| 3,007,029 | Levine | Oct. 31, 1961 |